Nov. 6, 1962 W. H. SCHUTMAAT 3,062,525
ADJUSTING DEVICE FOR PRESSURE REGULATOR VALVE
Filed June 4, 1959
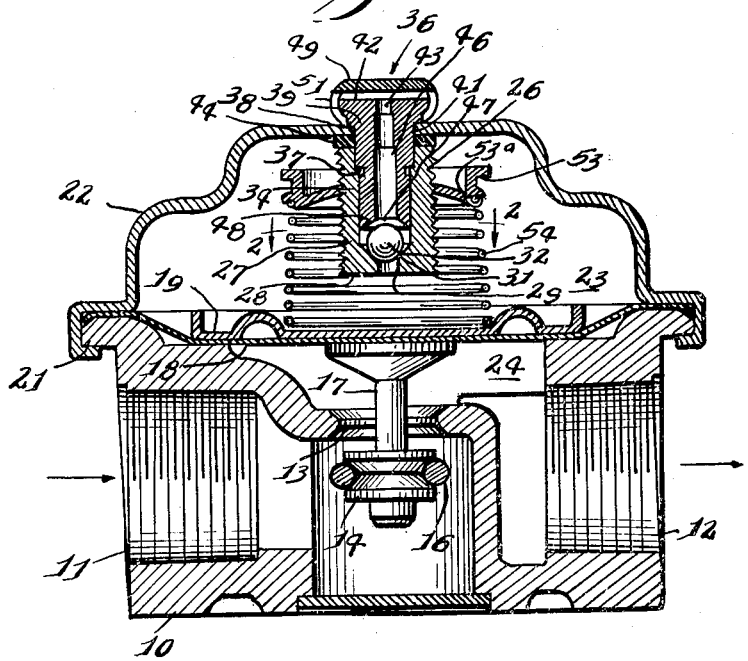
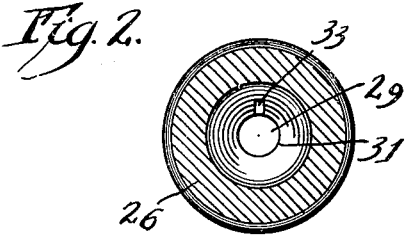
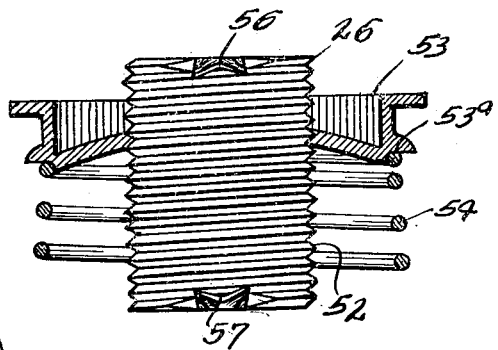
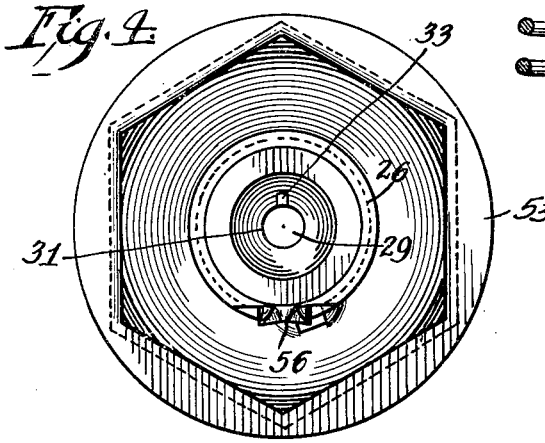
Inventor.
Wayne H. Schutmaat.
By Hofgren, Brady,
Wegner, Allen & Stellman
Attorneys.

United States Patent Office 3,062,525
Patented Nov. 6, 1962

3,062,525
ADJUSTING DEVICE FOR PRESSURE REGULATOR VALVE
Wayne H. Schutmaat, Elkhart, Ind., assignor to Penn Controls, Inc., Goshen, Ind., a corporation
Filed June 4, 1959, Ser. No. 818,164
4 Claims. (Cl. 267—1)

This invention relates generally to positional adjusting devices and in particular to an adjusting device for a diaphragm type pressure regulator valve.

Diaphragm type pressure regulating valves are conventionally used with, for example, various gas burning appliances. In this conventional type of valve the movement of the gas pressure responsive diaphragm is opposed by a compression-type coiled spring, a means for adjusting the spring, and hence the control point of the regulator, being accessible exteriorly of the valve housing. Similarly, valves of the type referred to are often provided with attachments for controlling the flow of air into and from the chamber above the diaphragm to thereby control the action of the valve member. Abbott Patent 2,302,284 discloses a regulating valve of the conventional type and having an air flow control attachment incorporated therein.

The present invention is directed to an improved apparatus for providing the regulator spring adjustment and which may additionally provide a means for controlling the rate of pressure change in the upper diaphragm chamber of the regulating valve.

It is an object of the present invention, therefore, to provide an adjusting device for a pressure regulator valve which is accessible from the exterior of the valve housing and which prevents tampering with the regulator spring or adjusting it beyond safe limits.

It is a further object of the present invention to provide an adjusting device which can be conventionally inserted and sealed within an accommodating aperture in the cover component of a regulator valve housing, the sealing means also providing the desired frictional drag on the adjusting stud.

It is a further object of the present invention to provide an adjusting device of the type referred to above which incorporates a means for controlling the rate of pressure change in the upper diaphragm chamber of a regulating valve.

The full nature of the invention will be understood from the accompanying drawings and the following description and claims:

FIG. 1 is a side sectional view of a regulating valve incorporating the adjusting device of the present invention.

FIG. 2 is a sectional view taken generally along the line 2—2 of FIG. 1.

FIG. 3 is an enlarged, detailed view of a portion of the apparatus of the present invention.

FIG. 4 is a top elevation view of the portion of the apparatus shown in FIG. 3.

Referring initially to FIG. 1, the adjusting device of the present invention is shown incorporated in a diaphragm type pressure regulating valve, the specific valve construction itself forming no part of the present invention. The valve structure includes a housing which is formed of a body casting 10 having an inlet passage 11 and an outlet passage 12 therein. The inlet and outlet passages communicate through an aperture 13 whose effective size is varied by the vertical positioning of a valve member 14. The valve member includes an O-ring 16 which may engage the margin of the aperture 13 to close the valve. The valve member 14 is supported on a stem 17 which, at its upper end, is rigidly attached to a flexible diaphragm 18. The upper face of the diaphragm carries an overlying rigid plate 19.

The body casting 10 is provided with a peripheral flange 21 over which is crimped the marginal edge of a generally cup-shaped cover member 22. The cover member thus overlies the upper face of the diaphragm to define a chamber 23 which is open to atmosphere by a means to be subsequently described. A chamber 24 underlying the diaphragm communicates with the outlet passage 12 of the valve. It may thus be seen that with upward movement of the diaphragm being resisted by a resilient means to be subsequently described, the diaphragm will position the valve member 14 so as to maintain a constant pressure drop across the aperture 13 with the magnitude of the pressure drop being dependent upon the magnitude of the downward bias of the diaphragm 18. It will be understood that the valve construction could be such that the valve member 14 approaches the aperture 13 from its upper side. Under these conditions, the diaphragm would be provided with an upward bias by any suitable means such as a tension spring. The adjusting device of the present invention, now to be described, would function identically with either type of valve construction.

The apparatus of the present invention includes a tubular member 26 having a central bore 27 therein terminating at an end wall 28. The end wall is provided with an aperture 29 of reduced size and the area of junction of the aperture 29 and the bore 27 is defined by an inclined annular face 31 against which seats a sphere or ball 32 preferably formed of nylon. Complete closure of the aperture 29 by the ball 32 is prevented by the presence of a small notch 33 formed in the annular surface 31, the disposition of the notch being shown in FIG. 2. The notch thus provides a by-pass around the ball 32.

The central bore in the tubular member 26 has inserted therein, by a press fit, a transversely fluted shank 34 of an adjusting stud generally indicated at 36. The stud and tubular member are provided with engaging shoulders 37 and 38 which define the depth of insertion of the stud into the tubular member. The somewhat enlarged portion 39 extends freely through an aperture 41 in the cover member 22, the stud being further provided with an enlarged head 42 which overlies the portion of the cover member adjacent the aperture. The head 42 may be provided with a screwdriver slot 43. A sealing means, preferably in the form of an O-ring 44, is disposed between the under face of the cover member 22 and the upper end of the tubular member 26. It will be noted that the cooperating shoulders 37 and 38 are disposed so that they define a depth of insertion of the stud into the tubular member such that, when assembled, the O-ring is properly compressed to seal the entry of the stud into the aperture 41 and to apply a frictional force resisting rotation of the stud so as to permit its accurate adjustment and to prevent its being jarred out of adjustment. Upon rotation of the stud the complete assembly, including the tubular member 26 and the O-ring 44, is rotated with the stud with the frictional resisting force being generated at the engaging surfaces of the O-ring and the cover member.

The stud 36 has a central, axial bore 46, the lower end of which is provided with an inclined annular surface 47 which is interrupted by a notch 48 therein, similar to the notch 33 in member 26. The upper end of the bore 46 extends through the stud and opens into the notch 43 in the stud head. A snap-on cap 49 is positioned over the stud head and is provided with a plurality of legs 51 which grip the stud head and permit communication of the bore 46 with atmosphere. The ball 32 is adapted to seat against the annular surface 47 under certain conditions of operation, the notch 48 providing a by-pass around the ball.

The outer surface of the tubular member is threaded as indicated at 52 in FIG. 3, and accommodates a spring retaining member 53. Bottomed on the retaining member is a compression spring 54 having a somewhat frusto-conical configuration, the lower end of the spring bearing against the upper face of the plate 19. The surface 53a of the spring retainer, against which the upper coil of the spring 54 bears, has a hexagonal configuration so that the spring retainer member and the spring are rotationally locked together. The frictional force exerted by the spring 54 is such that the spring and consequentially the spring retainer 53 are held against rotation as the stud 36 and consequently the tubular member 26 are rotated. It may thus be seen that by rotating the stud the spring retaining member 53 will be positioned axially along the tubular member with this axial positioning of the spring retaining member defining the downward bias exerted by the spring 54 upon the diaphragm.

As may be clearly seen in FIG. 3 and FIG. 4, the uppermost effective thread and the lowermost effective thread on the tubular member is interrupted or notched at 56 and 57, respectively. The function of the notches is to rotationally lock the spring retaining member 53 to the tubular member at each extremity of the range of axial motion of the spring retaining member. Thus, as the stud is rotated so as to drive the retaining member 53 to a position in which it will engage the notch 57, further rotational movement of the stud will cause the spring retaining member to rotate with the tubular member. This rotation of the retaining member 53 will cause the lower coil of the spring to slide upon the plate 19 and, while rotation of the stud may continue, this further rotation will not alter the position of the retaining member 53, and consequently will not change the biasing force of spring 54. When the stud is rotated so that the notch 56 is engaged by the retaining member 53, as shown in FIG. 4, the same action will occur. Thus, it may be seen that the placement of the notches 56 and 57 defines the range of adjustment of the bias of spring 54. Any rotation of the stud beyond either end of the range of adjustment defined by the notches will have no effect on the biasing force of the spring.

In operation, any increase in outlet pressure of the valve will be reflected in an increase in pressure in the chamber 24. The valve member 14 will thereupon be moved by the diaphragm 18 to maintain a constant pressure drop across the aperture 13, the magnitude of the pressure drop being determined by the control point setting of the spring 54.

As the valve member 14 moves toward or away from the aperture 13, air must be exhaled or inhaled respectively from the chamber 23. As air is exhalted from the chamber, the ball 32 is initially driven against the surface 47 with the rate of initial passage of air being determined by the size of the notch 48. When air is inhaled into the chamber, the ball will be seated against the surface 31 in the tubular member 26 with the rate of inhalation being determined by the size of the notch 33. It may thus be seen that the ball and its cooperating seating surfaces 47 and 31 determine the rate of inhalation and exhalation of air into the chamber 23 and hence the rate of motion of the valve member 13.

The control point of the regulating valve may be varied by removing the cap 49 and adjustably rotating the stud and the parts attached thereto. The engagement of the retaining member 53 with the thread notches 56 and 57 prevents tampering with the spring 54 and prevents adjustment of the spring beyond safe limits. The over-firing of a gas burner appliance by inexperienced personnel is thus prevented. As previously pointed out, the cooperation of the shoulders 37 and 38 in the tubular member 26 and the stud 34, automatically provides compression of the O-ring 44 to seal the entry of the stud into the cover and to provide the desired frictional force resisting rotation of the stud. The arrangement of the components of the adjusting device also permits the convenient integration therein of a means for controlling the entry and exit of air from the chamber above the diaphragm.

While the invention has been disclosed and described in some detail in the drawings and foregoing description, they are to be considered as illustrative and not restrictive in character, as modifications may readily suggest themselves to persons skilled in this art and within the broad scope of the invention, reference being had to the appended claims.

The invention claimed is:

1. In a spring-urged diaphragm fluid pressure regulator, spring adjustment means comprising a cover member, a spring within the cover member, a tubular member and an adjusting stud received within said tubular member by a press fit, cooperating shoulders formed on said tubular member and stud for limiting the depth of insertion of the stud therein, the extending portion of said stud being freely accommodated within an aperture in the cover member and having a head portion overlying the outer cover face, an O-ring between the inner cover face and the adjacent end of said tubular member, said cooperating shoulders being disposed so that when engaged said O-ring is compressed to seal said stud in said aperture and to provide a frictional force resisting rotation of said stud, said tubular member being externally threaded, a retaining member for said spring accommodated on said threads, whereby rotation of said stud adjustably positions said retaining member axially to define the force exerted by said spring, the effective uppermost and lowermost of the tubular member threads being interrupted whereby said retaining member is rotated with said stud at the extremities of its travel to limit the range of adjustment of the spring force.

2. In a diaphragm fluid pressure regulator, adjustment means comprising a cover member, resilient means within the cover member, a tubular member and an adjusting stud received within said tubular member by a press fit, cooperating shoulders formed on said tubular member and stud for limiting the depth of insertion of the stud therein, the extending portion of said stud being freely accommodated within an aperture in the cover member, an abutment carried by said stud overlying the outer cover face, an O-ring between the inner cover face and the adjacent end of said tubular member, said cooperating shoulders being disposed so that when engaged said O-ring is compressed to seal said stud in said aperture and to provide a frictional force resisting rotation of said stud, said tubular member being externally threaded, a spring retaining member accommodated on said threads, said resilient means extending from said retaining member, whereby rotation of said stud adjustably positions said retaining member axially to define the position of the adjacent end of said resilient means, the effective uppermost and lowermost of the tubular member threads being interrupted whereby said retaining member is rotated with said stud at the extremities of its travel to limit the range of adjustment of the force exerted by the resilient means.

3. In a diaphragm fluid pressure regulator, adjustment means comprising a cover member, resilient means within the cover member, a tubular member and an adjusting stud received within said tubular member by a press fit, cooperating shoulders formed on said tubular member and stud for limiting the depth of insertion of the stud therein, the extending portion of said stud being freely accommodated within an aperture in the cover member, an abutment carried by said stud overlying the outer cover face, an O-ring surrounding said stud adjacent a cover face, said cooperating shoulders being disposed so that when engaged said O-ring is compressed to seal said stud in said aperture and to provide a frictional force resisting rotation of said stud, and means engaging said resilient means adjusted by rotation of said stud.

4. In a diaphragm fluid pressure regulator, a resilient member adjustment means comprising a cover member, a resilient member within the cover member, an element having an externally threaded portion and an extending portion, the extending portion of said element being freely accommodated within an aperture in the cover member and having a head portion overlying the outer cover face, an O-ring between the inner cover face and the adjacent end of said externally threaded portion, the length of said extending portion being such that said O-ring is compressed to seal said extending portion in said aperture and to provide a frictional force resisting rotation thereof, a retaining member for said resilient member accommodated on said externally threaded portion, whereby rotation of said extending portion adjustably positions said retaining member axially upon said threaded portion to define the force exerted by said resilient member, the effective uppermost and lowermost of the threads on said threaded portion being interrupted whereby said retaining member is rotated with said extending portion at the extremities of its travel to limit the range of adjustment of the force exerted by said resilient member.

References Cited in the file of this patent

UNITED STATES PATENTS

| | | |
|---|---|---|
| 890,285 | Krantz | June 9, 1908 |
| 1,519,231 | Benjamin | Dec. 16, 1924 |
| 2,581,429 | Meyer | Jan. 8, 1952 |
| 2,582,519 | Wynne | Jan. 15, 1952 |
| 2,663,122 | Cornelius | Dec. 22, 1953 |
| 2,735,669 | Seiler | Feb. 21, 1956 |
| 2,768,643 | Acomb | Oct. 30, 1956 |
| 2,796,076 | Hottenroth | June 18, 1957 |
| 2,918,081 | Laver | Dec. 22, 1959 |